US008225832B2

(12) United States Patent
Suzuki

(10) Patent No.: US 8,225,832 B2
(45) Date of Patent: Jul. 24, 2012

(54) PNEUMATIC TIRE

(75) Inventor: Takayuki Suzuki, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1066 days.

(21) Appl. No.: 12/158,841

(22) PCT Filed: Oct. 5, 2007

(86) PCT No.: PCT/JP2007/069571
§ 371 (c)(1),
(2), (4) Date: Jun. 23, 2008

(87) PCT Pub. No.: WO2008/053668
PCT Pub. Date: May 8, 2008

(65) Prior Publication Data
US 2009/0194213 A1 Aug. 6, 2009

(30) Foreign Application Priority Data

Oct. 31, 2006 (JP) ................................. 2006-295433

(51) Int. Cl.
B60C 11/13 (2006.01)
(52) U.S. Cl. ......... 152/209.19; 152/209.21; 152/209.22; 152/209.24; 152/DIG. 1
(58) Field of Classification Search ............. 152/209.18, 152/209.19, 209.21, 209.22, 209.24, DIG. 1
See application file for complete search history.

(56) References Cited

U.S. PATENT DOCUMENTS

| 3,664,402 | A | * | 5/1972 | Montagne ................ 152/209.24 |
| 5,115,850 | A | | 5/1992 | Crump et al. |
| 5,417,269 | A | * | 5/1995 | Kinoshita et al. ........ 152/209.19 |
| 7,703,491 | B2 | * | 4/2010 | Oyama .................... 152/209.19 |
| 2005/0230020 | A1 | | 10/2005 | Miyake |
| 2007/0062626 | A1 | * | 3/2007 | Oyama .................... 152/209.19 |

FOREIGN PATENT DOCUMENTS

| JP | 59-172004 | | 11/1984 |
| JP | 61-291203 | * | 12/1986 |
| JP | 02-179506 | | 7/1990 |
| JP | 04-106002 | | 9/1992 |
| JP | 04-274906 | | 9/1992 |

(Continued)

OTHER PUBLICATIONS

Decision of Patent Grant issued by the Patent Office of Japan for related JP Application No. 2006-295433, maked Jan. 4, 2012, with English language translation.

Primary Examiner — Steven D Maki
Assistant Examiner — Robert Dye
(74) Attorney, Agent, or Firm — Greer, Burns & Crain, Ltd.

(57) ABSTRACT

A pneumatic tire includes on a tread a plurality of circumferential main grooves extending in the tire circumferential direction, and a plurality of land portions formed by being partitioned by the circumferential main grooves. A protrusion is formed on a groove bottom of at least one of the circumferential main grooves. The protrusion continuously extends in a groove-length direction of the circumferential main groove, and a height h1 of the protrusion varies in a wavelike form along the groove-length direction. Moreover, junctions each of which couples the protrusion onto at least one of groove walls of the circumferential main groove are formed on the groove bottom of the circumferential main groove.

9 Claims, 7 Drawing Sheets

FOREIGN PATENT DOCUMENTS

| | | |
|---|---|---|
| JP | 05-278414 | 10/1993 |
| JP | 06-183212 | 7/1994 |
| JP | 06-239107 * | 8/1994 |
| JP | A 6-239107 | 8/1994 |
| JP | 10-035224 | 10/1998 |
| JP | A 2001-253211 | 9/2001 |
| JP | A 2002-234313 | 8/2002 |
| JP | A 2005-324775 | 11/2005 |
| JP | A 2006-51836 | 2/2006 |
| JP | A 2006-111216 | 4/2006 |
| WO | PCT/PCT 2006/043373 | 4/2006 |

* cited by examiner

FIG.10

| | CONVENTIONAL EXAMPLE 1 | CONVENTIONAL EXAMPLE 2 | CONVENTIONAL EXAMPLE 3 | COMPARATIVE EXAMPLE 1 | INVENTION EXAMPLE 1 | INVENTION EXAMPLE 2 | INVENTION EXAMPLE 3 | INVENTION EXAMPLE 4 |
|---|---|---|---|---|---|---|---|---|
| CONTINUITY IN CIRCUMFERENTIAL DIRECTION | DISCONTINUOUS | CONTINUOUS | CONTINUOUS | CONTINUOUS | CONTINUOUS | CONTINUOUS | CONTINUOUS | CONTINUOUS |
| HEIGHT h1 | CONSTANT | CONSTANT | VARIED | VARIED | VARIED | VARIED | VARIED | VARIED |
| PRESENCE OF JUNCTION | NONE | NONE | NONE | PRESENT | PRESENT | PRESENT | PRESENT | PRESENT |
| ARRANGEMENT OF JUNCTION | - | - | - | ONLY ONE SIDE | ALTERNATELY ON RIGHT AND LEFT | ALTERNATELY ON RIGHT AND LEFT | ALTERNATELY ON RIGHT AND LEFT | ALTERNATELY ON RIGHT AND LEFT |
| W/P | - | - | - | 1 | 0.2 | 0.3 | 2.0 | 2.2 |
| NUMBER OF STONE TRAPPING | 13 | 12 | 12 | 8 | 6 | 4 | 3 | 3 |
| NUMBER OF DAMAGED PORTIONS ON LUG | 13 | 8 | 7 | 8 | 3 | 3 | 3 | 6 |

FIG.11

|  | INVENTION EXAMPLE 5 | INVENTION EXAMPLE 6 | INVENTION EXAMPLE 7 | INVENTION EXAMPLE 8 | INVENTION EXAMPLE 9 |
|---|---|---|---|---|---|
| CONTINUITY IN CIRCUMFERENTIAL DIRECTION | CON-TINUOUS | CON-TINUOUS | CON-TINUOUS | CON-TINUOUS | CON-TINUOUS |
| HEIGHT h1 | VARIED | VARIED | VARIED | VARIED | VARIED |
| PRESENCE OF JUNCTION | PRESENT | PRESENT | PRESENT | PRESENT | PRESENT |
| ARRANGEMENT OF JUNCTION | ALTER-NATELY ON RIGHT AND LEFT | ALTER-NATELY ON RIGHT AND LEFT | ALTER-NATELY ON RIGHT AND LEFT | ALTER-NATELY ON RIGHT AND LEFT | ALTER-NATELY ON RIGHT AND LEFT |
| W/P | 1 | 1 | 1 | 1 | 1 |
| VARIABILITY OF GROOVE WALL ANGLE | VARIED | VARIED | VARIED | VARIED | VARIED |
| POSITION OF JUNCTION | MAXIMUM PORTION | MIDDLE PROTION | MINIMUM PORTION | MIDDLE PROTION | MIDDLE PROTION |
| GROOVE WALL ANGLE VARIATION R | 12 | 12 | 12 | 5 | 20 |
| NUMBER OF STONE TRAPPING | 2 | 3 | 5 | 4 | 2 |
| NUMBER OF DAMAGED PORTIONS ON LUG | 4 | 3 | 3 | 2 | 3 |

FIG.12

|  | INVENTION EXAMPLE 10 | INVENTION EXAMPLE 11 | INVENTION EXAMPLE 12 |
|---|---|---|---|
| CONTINUITY IN CIRCUMFERENTIAL DIRECTION | CONTINUOUS | CONTINUOUS | CONTINUOUS |
| HEIGHT h1 | VARIED | VARIED | VARIED |
| PRESENCE OF JUNCTION | PRESENT | PRESENT | PRESENT |
| ARRANGEMENT OF JUNCTION | ALTERNATELY ON RIGHT AND LEFT | ALTERNATELY ON RIGHT AND LEFT | ALTERNATELY ON RIGHT AND LEFT |
| W/P | 1 | 1 | 1 |
| GROOVE WALL ANGLE $\alpha$ | 10 | 15 | 20 |
| GROOVE WALL ANGLE $\beta$ | 5 | 5 | 8 |
| NUMBER OF STONE TRAPPING | 4 | 3 | 2 |
| NUMBER OF DAMAGED PORTIONS ON LUG | 2 | 3 | 2 |

PNEUMATIC TIRE

This application is a U.S. National Phase under 35 U.S.C. §371, of International Application No. PCT/JP2007/069571, filed Oct. 5, 2007.

TECHNICAL FIELD

The present invention relates to a pneumatic tire. More specifically, the present invention relates to a pneumatic tire that can reduce trapping of stones in a circumferential main groove.

BACKGROUND ART

Pneumatic tires used for on-road and off-road driving have a problem such that trapping of stones (stone stuffing) in circumferential main grooves needs to be reduced. When such trapping of stones occurs, separation may appear on a tread by stone drilling, and a retread rate may decrease, bringing about unfavorable results. For this reason, to reduce such trapping of stones, a recent heavy duty pneumatic tire is provided with a protrusion (stone ejector) on a groove bottom of the circumferential main groove.

A technology disclosed in Patent Document 1 has been known as a conventional pneumatic tire that employs such configuration. According to the conventional pneumatic tire (a pneumatic tire that includes a stone-stuffing protective protrusion), a stone-stuffing protective protrusion projects continuously along the circumferential direction from the groove bottom of the circumferential main groove on the tread of the pneumatic tire, and the stone-stuffing protective protrusion includes an outer surface on which curvilinear concaves and convexes are alternately formed in waves in the circumferential direction.

Patent Document 1: Japanese Patent Application Laid-open No. H6-239107

DISCLOSURE OF INVENTION

Problem to be Solved by the Invention

An object of the present invention is to provide a pneumatic tire that can reduce trapping of stones in a circumferential main groove.

Means for Solving Problem

According to an aspect of the present invention, a pneumatic tire includes on a tread a plurality of circumferential main grooves extending in a tire-circumferential direction and a plurality of land portions formed by being partitioned by the circumferential main grooves, and includes a protrusion that is formed on a groove bottom of at least one of the circumferential main grooves and extends along a groove-length direction of the circumferential main groove, and of which a height h1 is corrugated in a wavelike form along the groove-length direction; and a junction that couples the protrusion onto at least one of groove walls of the circumferential main groove.

Effect of the Invention

According to the pneumatic tire, because each of junctions couples a protrusion onto at least one of groove walls of the circumferential main groove, rigidity of the protrusion is reinforced by the junctions. Accordingly, the pneumatic tire has advantages that falling of the protrusion caused by a stone trapped in the circumferential main groove can be restricted, and damage to (for example, breakage of) the protrusion can be effectively reduced.

BRIEF DESCRIPTION OF DRAWINGS

FIG. 10 is a table that presents results of performance tests of the pneumatic tires according to embodiments of the present invention.

FIG. 11 is a table that presents results of the performance tests of the pneumatic tires according to embodiments of the present invention.

FIG. 12 is a table that presents results of the performance tests of the pneumatic tires according to embodiments of the present invention.

Figure 1:
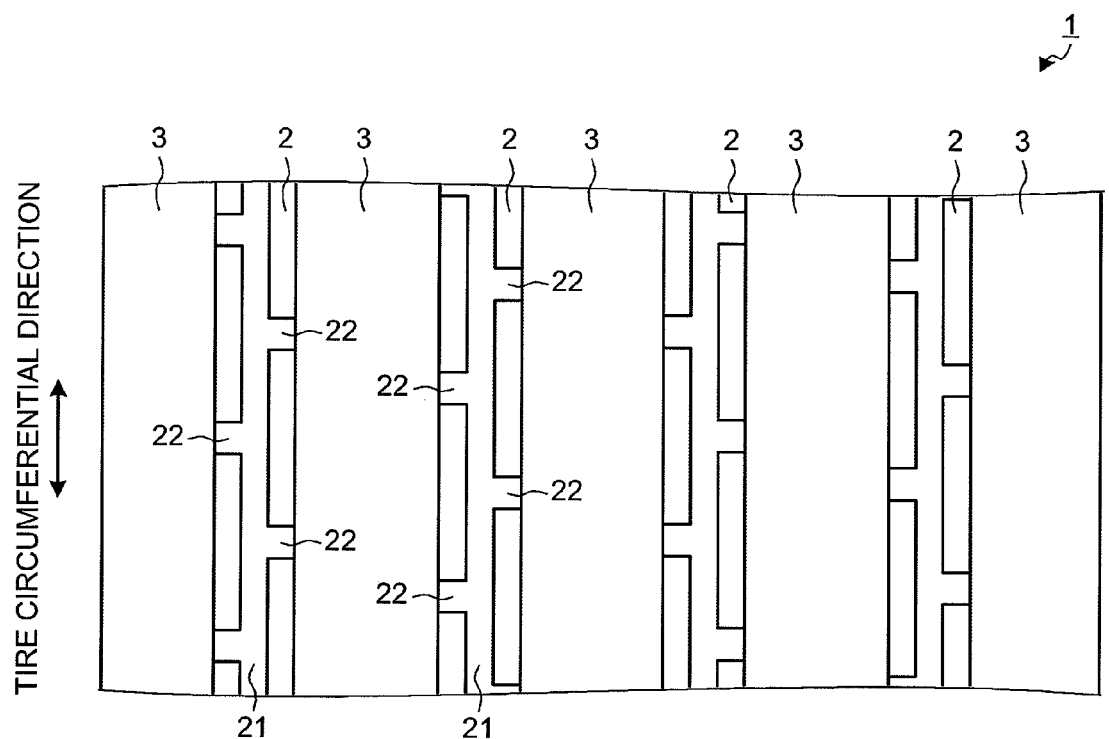
FIG. 1 is a plan view that depicts a tread surface of a pneumatic tire according to an embodiment of the present invention.

EXPLANATIONS OF LETTERS OR NUMERALS 1 pneumatic tire
2 circumferential main groove
3 land portion
21 protrusion
22 junction
23 groove bottom
24 groove wall
25 groove opening

BEST MODE(S) FOR CARRYING OUT THE INVENTION

The present invention will be explained below in detail with reference to the drawings. The present invention is not limited by embodiments. Components according to the embodiments include components that can be replaced with others easily by a person skilled in the art, or the substantially same components as conventional ones. A plurality of modifications described in the embodiments can be arbitrarily combined within a scope obvious to a person skilled in the art.

Embodiment

Figure 2:
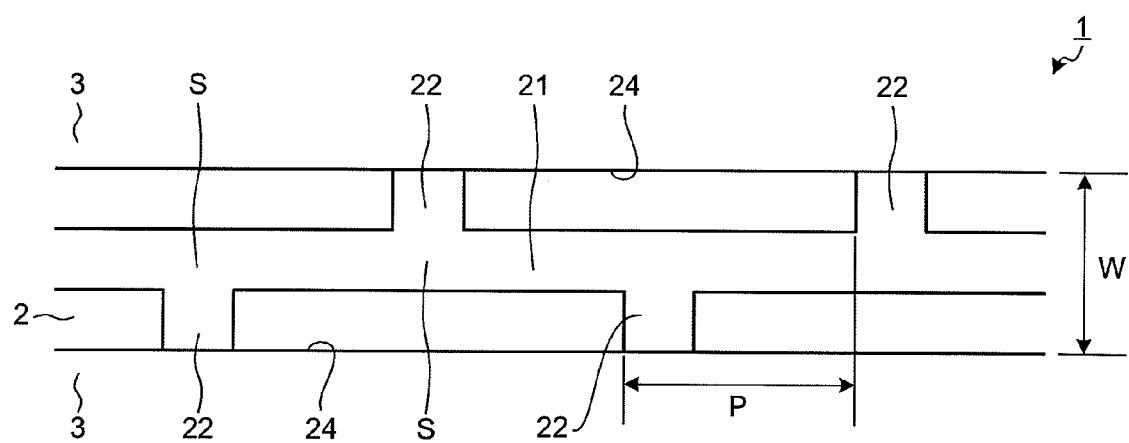
FIG. 2 is a plan view of a circumferential main groove of the pneumatic tire shown in FIG. 1.
Figure 3:
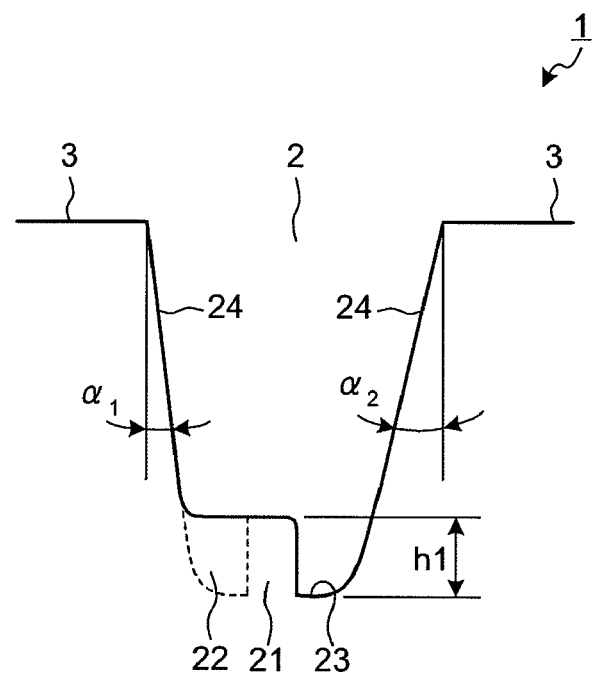
FIG. 3 is a cross-sectional view in a tire meridian direction of the circumferential main groove of the pneumatic tire shown in FIG. 1.
Figure 6:
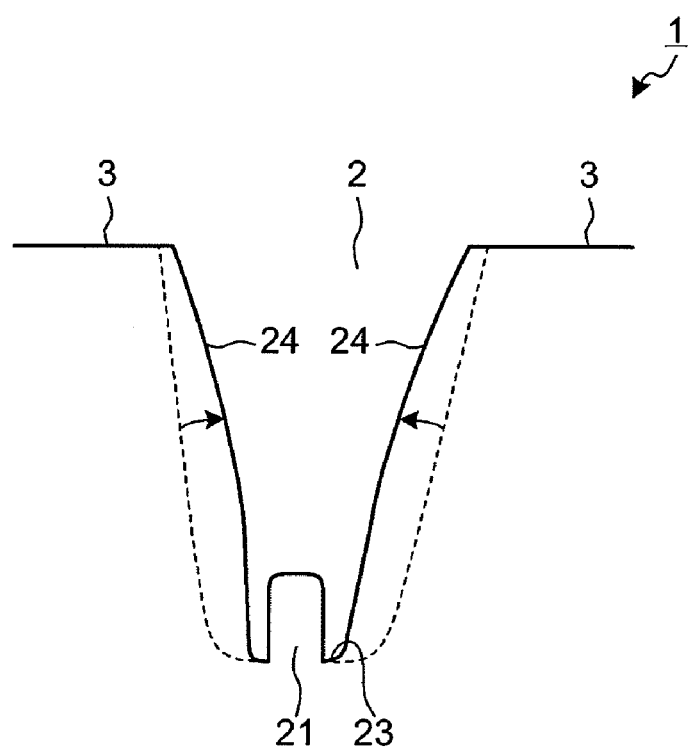
FIG. 6 is a schematic diagram for explaining an action of the protrusion in the circumferential main groove shown in FIG. 2.
Figure 7:
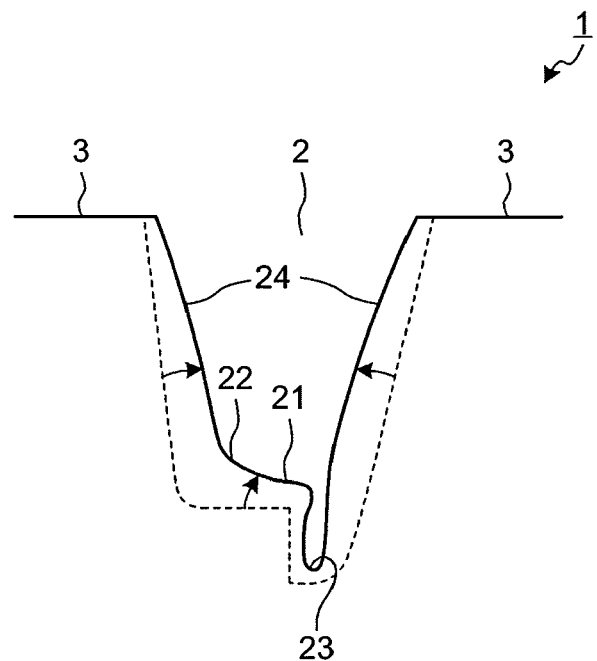
FIG. 7 is a schematic diagram for explaining an action of the protrusion in the circumferential main groove shown in FIG. 2.
Figure 8:
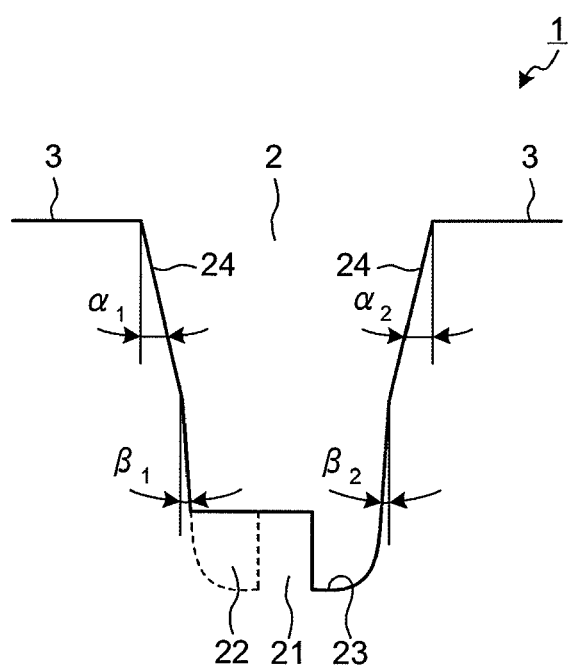
FIG. 8 is a schematic diagram for explaining a modification of the pneumatic tire shown in FIG. 1.
Figure 9:
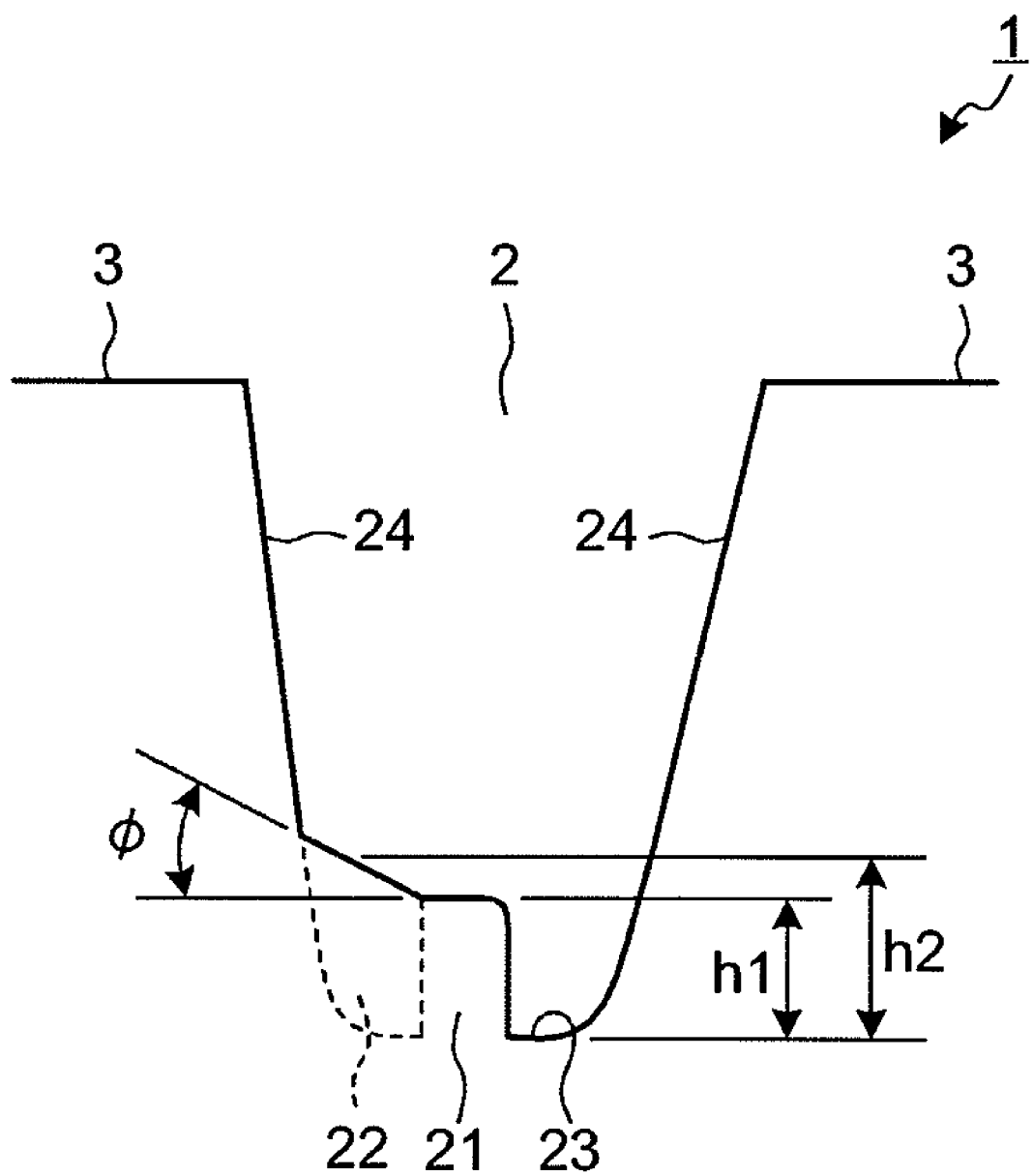
FIG. 9 is a schematic diagram for explaining a modification of the pneumatic tire shown in FIG. 1.

FIG. 1 is a plan view that depicts a tread surface of a pneumatic tire according to an embodiment of the present invention. FIGS. 2 and 3 are a plan view (FIG. 2) and a cross-sectional view in a tire meridian direction (FIG. 3) of a circumferential main groove of the pneumatic tire shown in FIG. 1. FIGS. 4 to 7 are schematic diagrams for explaining a configuration representing a protrusion in the circumferential main groove shown in FIG. 2 (FIGS. 4 and 5) and schematic diagrams for explaining actions of the protrusion (FIGS. 6 and 7). FIGS. 8 to 9 are schematic diagrams for explaining modifications of the pneumatic tire shown in FIG. 1. FIGS. 10 to 12 are tables in which results of performance tests of the pneumatic tires according to embodiments of the present invention are shown.

A pneumatic tire 1 includes on a tread a plurality of circumferential main grooves 2 extending in the tire circumferential direction, and a plurality of land portions 3 formed by being partitioned by the circumferential main grooves 2 (see FIG. 1). The pneumatic tire 1 includes, for example, four of the circumferential main grooves 2 formed on the tread, and the rib-shaped land portions 3 are formed by the circumferential main grooves 2 (rib pattern). According to the embodiment, such rib pattern is formed on the tread surface, however, not limited to this, any block pattern (not shown) can be formed.

Figure 4:
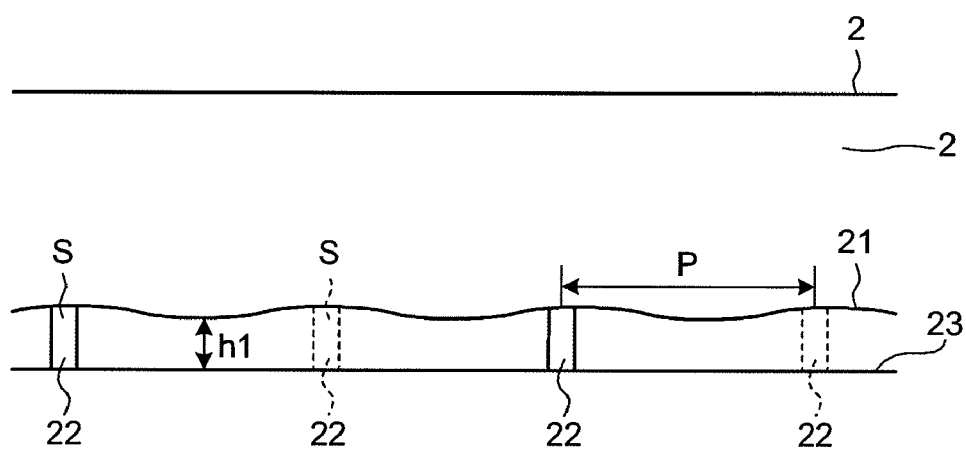
FIG. 4 is a schematic diagram for explaining a configuration representing a protrusion in the circumferential main groove shown in FIG. 2.

A protrusion 21 and junctions 22 are formed in each of the circumferential main grooves 2 (see FIGS. 2 to 4). The protrusion 21 and the junctions 22 are formed at once with a tire-forming mold when molding the circumferential main grooves 2. The protrusion 21 and the junctions 22 can be formed in all of the circumferential main grooves 2 on the tread surface (see FIG. 1), or can be formed in some of the circumferential main grooves 2 (not shown).

The protrusion 21 is formed on a groove bottom 23 of at least one of the circumferential main grooves 2. The protrusion 21 continuously extends in a groove-length direction of the circumferential main groove 2. In other words, the protrusion 21 has a ribbed shape having a substantially constant width, and extends over the entire tire circumference on the groove bottom 23 of the circumferential main groove 2. Moreover, a height h1 of the protrusion 21 is corrugated regularly in a wavelike corrugated form along the groove-length direction of the circumferential main groove 2. The height h1 of the protrusion 21 is defined as a distance from the groove bottom 23 of the circumferential main groove 2 to the top of the protrusion 21. Thus, the protrusion 21 extends in the groove-length direction of the circumferential main groove 2 while a level of the top of the protrusion 21 rises and falls regularly in the corrugated form.

Each of the junctions 22 couples the protrusion 21 onto one of groove walls 24 of the circumferential main groove 2. The junction 22 has a ribbed shape having, for example, the substantially same width as that of the protrusion 21, and couples a side surface of the protrusion 21 onto the groove wall 24 of the circumferential main groove 2 in a groove-width direction of the circumferential main groove 2.

According to the pneumatic tire 1, because the protrusion 21 formed on the groove bottom 23 of the circumferential main groove 2 continuously extends in the groove-length direction of the circumferential main groove 2 (see FIG. 2), the pneumatic tire 1 has advantages that stone trapping in the circumferential main groove 2 can be effectively reduced, and damage to the protrusion can be reduced, compared with a configuration that protrusions discontinuously extends in the groove-length direction (not shown). For example, according to a configuration that a plurality of blocked protrusions is arranged on the groove bottom of the circumferential main groove along the groove-length direction, rigidity of the protrusions is insufficient compared with a ribbed protrusion, so that an effect of reducing stone trapping cannot be sufficiently obtained, and there is a possibility that a part of the protrusions may be damaged by a stone trapped in the circumferential main groove.

Moreover, according to the pneumatic tire 1, because the height h1 of the protrusion 21 is corrugated in a wavelike form along the groove-length direction of the circumferential main groove 2 (see FIG. 4), cushioning properties of the protrusion 21 (flexibility to an external force in the direction of the height h1) are improved, compared with a configuration that a height of the protrusion is constant along the groove-length direction of the circumferential main groove. Accordingly, the pneumatic tire 1 has an advantage that damage to the protrusion 21 can be reduced. The height h1 of the protrusion 21 can be corrugated either regularly or irregularly along the groove-length direction.

Furthermore, according to the pneumatic tire 1, because each of the junctions 22 couples the protrusion 21 onto at least one of the groove walls 24 of the circumferential main groove 2 (see FIG. 3), the rigidity of the protrusion 21 is reinforced by the junction 22. Accordingly, the pneumatic tire 1 has advantages that falling of the protrusion 21 caused by a stone trapped in the circumferential main groove 2 can be restricted, and damage to (breakage of) the protrusion 21 can be effectively reduced.

Moreover, according to the configuration, when contacting the ground, the groove walls 24 of the circumferential main groove 2 expand such that the groove walls 24 narrows a cross section of the groove (see FIGS. 6 and 7). When the groove walls 24 expand, such expansion of the groove walls 24 are relatively small at portions on which none of the junctions 22 is arranged (see FIG. 6). On the other hand, at a portion on which the junction 22 is arranged, the groove walls 24 largely expands together with the junction 22 (see FIG. 7). Accordingly, because of the expansion of the groove walls 24, stone trapping in the circumferential main groove 2 can be effectively reduced.

[Additional Aspect 1]

Additionally, it is preferable for the pneumatic tire 1 that each of the junctions 22 couples the protrusion 21 onto one of the groove walls 24 of the circumferential main groove 2, and each of the junctions 22 are alternately arranged on the both sides of the protrusion 21 along the groove-length direction of the circumferential main groove 2 (see FIG. 2). In other words, it is preferable that the junctions 22 individually couple the protrusion 21 onto the groove walls 24 of the circumferential main groove 2 each at one side of the protrusion 21, and each of the junctions 22 are alternately arranged on from the right side to the left side along an extending direction of the protrusion 21 (the groove-length direction of the circumferential main groove 2).

Thus, according to such configuration, the protrusion 21 is supported by the junctions 22 alternately from the both right and left sides, so that the rigidity of the protrusion 21 is appropriately ensured. Accordingly, the pneumatic tire 1 has advantages that falling of the protrusion 21 can be restricted and damage to the protrusion 21 can be reduced. For example, according to a configuration that the junctions are arranged at only one side of the protrusion (not shown), the protrusion tends to have insufficient rigidity, compared with the configuration that the junctions 22 are arranged at the both side of the protrusion 21 (see FIG. 2). Consequently, there is a possibility that the protrusion may fall due to a stone trapped in the circumferential main groove, and the protrusion may be damaged. According to another configuration that the junctions are arranged crosswise to the protrusion when looking at them from the top of the circumferential main groove (not shown), the protrusion tends to have excessive rigidity. Consequently, there is a possibility that cushioning properties of the protrusion may be insufficient, so that the protrusion may be damaged (a crack may appear on the protrusion) by a stone trapped in the circumferential main groove.

Moreover, it is preferable for the pneumatic tire 1 that the junction 22 couples the protrusion 21 onto the groove wall 24 of the circumferential main groove 2 at a position S at which the height h1 of the protrusion 21 reaches its maximum (see FIGS. 2 and 4). In other words, the junction 22 couples the protrusion 21 onto the groove wall 24 of the circumferential main groove 2 at a position where the rigidity of the protrusion 21 tends to be low (the position at which the height h1 reaches its maximum). Thus, according to such configuration, the rigidity of the protrusion 21 is effectively reinforced, so that falling of the protrusion 21 caused by a stone trapped in the circumferential main groove 2 can be restricted. Accordingly, the pneumatic tire 1 has an advantage that damage to the protrusion 21 can be effectively reduced.

[Additional Aspect 2]

Figure 5:
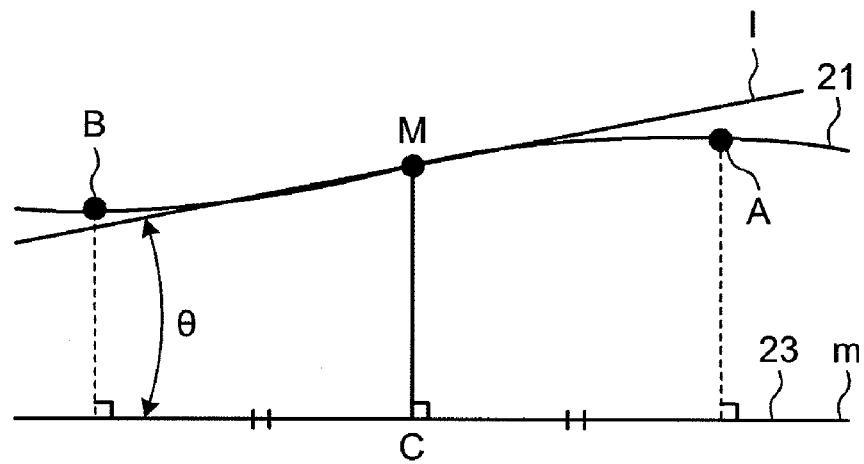
FIG. 5 is a schematic diagram for explaining the configuration representing the protrusion in the circumferential main groove shown in FIG. 2.

It is preferable for the pneumatic tire 1 that, with reference to a cross section of the circumferential main groove 2 in the groove-length direction and a groove-depth direction, an inclination angle θ between an inclination plane on the top of the protrusion 21 and the groove bottom 23 of the circumferential main groove 2 falls within a range of 3 [deg]≦θ≦30 [deg] (see FIG. 5). In other words, according to the configuration, as the height h1 of the protrusion 21 is corrugated in a wavelike form along the groove-length direction of the circumferential main groove 2, an inclination plane is formed on the top of the protrusion 21. As an angle between the inclination plane and the groove bottom 23 of the circumferential main groove 2 (the inclination angle θ) is gentler, a stiffness change of the protrusion 21 in the groove-length direction is smaller, and the protrusion 21 is damaged less easily.

According to the configuration, because the inclination angle θ between the inclination plane of the protrusion 21 and the groove bottom 23 of the circumferential main groove 2 is appropriately determined, the height h1 of the protrusion 21 gently varies along the groove-length direction. Accordingly, differences in levels of the top of the protrusion 21 (a variation in the height h1 in the groove-length direction) are moderated, so that the pneumatic tire 1 has an advantage that damage to the protrusion 21 can be reduced. For example, according to a configuration that the top of a protrusion 21 extends largely up and down along the groove-length direction of a circumferential main groove to ensure an elastic restoring force of the protrusion (see Patent Document 1), rigidity differences of the protrusion in the longitudinal direction are not uniform, so that there is a possibility that the protrusion may be damaged by a stone trapped in the circumferential main groove.

The inclination angle θ of the inclination plane of the protrusion 21 is defined as follows (see FIG. 5). First of all, in reference to the cross section of the circumferential main groove 2 in the groove-length direction (the extending direction of the protrusion 21) and the groove-depth direction, take a point A at the maximum of the height h1 of the protrusion 21, a point B at the minimum of the height h1, and a point M at the substantially middle of the point A and the point B, on the top surface (the inclination plane) of the protrusion 21. The point M is defined as the middle point between the point A and the point B in a configuration that the height h1 of the protrusion 21 varies like sine wave. Then, draw a line 1 through the point M to be in contact with the top of the protrusion 21. Then, draw a perpendicular line from the point M to the groove bottom 23 of the circumferential main groove 2, and the foot of the perpendicular is defined as a point C. Then, draw a line m through the point C to be in contact with the groove bottom 23 of the circumferential main groove 2. Thus, an angle between the line 1 and the line m is referred to as the inclination angle θ of the protrusion 21.

[Additional Aspect 3]
[Additional Aspect 3]

Additionally, it is preferable for the pneumatic tire 1 that a groove width W of the circumferential main groove 2 and an arrangement interval P between the junctions 22 satisfy relation of 0.3≦W/P≦2.0 (see FIG. 2). According to such configuration, the arrangement interval P between the junctions 22 is appropriately determined, so that rigidity of the protrusion 21 can be appropriately ensured. Accordingly, the pneumatic tire 1 has advantages that stone trapping in the circumferential main groove 2 can be effectively reduced, and damage to the protrusion 21 can be reduced. For example, if W/P<0.3, the arrangement interval P between the junctions is too long to the groove width W of the circumferential main groove, so that there is a possibility that rigidity of the protrusion may be insufficient, and the protrusion may be damaged by a stone trapped in the circumferential main groove. On the contrary, if 2.0<W/P, the arrangement interval P between the junctions is too short, so that cushioning properties of the protrusion is insufficient, and anti stone trapping performance in the circumferential main groove 2 is reduced.

According to the configuration that the junctions 22 are alternately arranged on form the right to the left of the protrusion 21 in the groove-length direction of the circumferential main groove 2, the arrangement interval P between the junctions 22 is defined by an interval between a pair of the junctions 22 lying next to each other on the left side and the right side of the protrusion 21.

[Additional Aspect 4]

Additionally, it is preferable for the pneumatic tire 1 that when an inclination angle α of the groove wall 24 of the circumferential main groove 2 with respect to the groove-depth direction periodically varies along the groove-length direction of the circumferential main groove 2, the junction 22 is arranged on a side closer to a position where an inclination angle α becomes a maximum value αmax than an intermediate position of the position where the inclination angle α becomes the maximum value αmax and a position where the inclination angle α becomes a minimum value αmin, of the circumferential main groove 2 (see FIG. 3). According to such configuration, because the junctions 22 are arranged appropriately to the groove walls 24, the pneumatic tire 1 has an advantage that stone trapping in the circumferential main groove 2 can be effectively reduced. For example, according to a configuration that the junction 22 is arranged on a side closer to the position at which the inclination angle α takes the minimum value αmin, the number of stone trapping in the circumferential main groove 2 is increased.

Moreover, it is preferable for the pneumatic tire 1 that when the inclination angle α of the groove wall 24 of the circumferential main groove 2 with respect to the groove-depth direction varies periodically along the groove-length direction of the circumferential main groove 2, a difference R between the maximum value αmax and the minimum value αmin of the inclination angle α of the circumferential main groove 2 falls within a range of 5 [deg]≦R≦30 [deg]. Thus, according to the configuration, a variation of the angles α of the groove walls of the circumferential main groove 2 (the difference R between the maximum value αmax and the minimum value αmin) is appropriately determined, so that the pneumatic tire 1 has advantages that stone trapping in the circumferential main groove 2 can be reduced, and damage to the protrusion 21 can be reduced. For example, if R<5 [deg], movement of a trapped stone in the circumferential main groove 2 is restricted, so that it is difficult to eject the stone, consequently, there is a possibility that an effect of reducing stone trapping in the circumferential main groove 2 may not be sufficiently obtained. On the contrary, R>30 [deg], rigidity of the groove wall 24 of the circumferential main groove 2 becomes high, consequently, there is a possibility that the groove wall 24 may be damaged.

[Additional Aspect 5]

Additionally, it is preferable for the pneumatic tire 1 that each of the groove walls 24 of the circumferential main groove 2 is inclined at a plurality of inclination angles α and β with respect to the groove-depth direction, where the inclination angle α on a side adjacent to a groove opening 25 of the circumferential main groove 2 and the inclination angle β on a side adjacent to the groove bottom satisfy relation of α>β (see FIG. 8). In other words, the inclination angle α on the side adjacent to the groove opening 25 of the circumferential main groove 2 is set larger than the inclination angle β on the side adjacent to the groove bottom 23, so that the groove width is configured to be larger at the groove opening 25. According to such configuration, because relation between the inclination angles α and β of the groove walls 24 at the groove opening 25 and the groove bottom 23 of the circumferential main groove 2 is appropriately determined, the pneumatic tire 1 has an advantage that stone trapping in the circumferential main groove 2 can be reduced.

For example, according to the embodiment, the groove walls 24 of the circumferential main groove 2 opposing to each other are inclined at different inclination angles α and β, and an inclination angle α1 (α2) on the side adjacent to the groove opening 25 and an inclination angle β1 (β2) on the side adjacent to the groove bottom 23 of each of the groove walls 24 satisfy relational α1>β1 (α2>β2). According to such configuration, it becomes easy for a trapped stone in the circumferential main groove 2 to come off from the groove opening 25.

[Additional Aspect 6]

Additionally, it is preferable for the pneumatic tire 1 that a height h2 of the junction 22 is increased from the protrusion 21 to one of the groove walls 24 of the circumferential main groove 2 (see FIG. 9). In other words, in reference to the cross section in the groove-width direction of the circumferential main groove 2, the junction 22 is configured to climb from the protrusion 21 to the groove wall 24 toward the groove opening 25.

When manufacturing the pneumatic tire 1, a rubber material that is to form the tread moves inside a tire-forming mold from an inner side in the tire-radial direction to an outer side in the tire-radial direction. When the rubber material moves, according to the configuration, because the junction 22 is configured to climb from the protrusion 21 to the groove wall 24 toward the groove opening 25, air efficiently goes through inside the tire-forming mold at the protrusion 21 and the junction 22. Accordingly, a flow of rubber at the protrusion 21 and the junction 22 is produced in a favorable condition, so that defective molding of the protrusion 21 and the junction 22 can be reduced. Accordingly, the protrusion 21 and the junction 22 are formed in appropriate shapes, so that the pneumatic tire 1 has an advantage that functions of the protrusion 21 and the junction 22 (reduction of stone trapping and restriction on damage) can be effectively performed.

Moreover, it is preferable in the configuration that the top of the junction 22 is inclined at an inclination angle φ from the protrusion 21 to the groove wall 24 of the circumferential main groove 2 toward the groove opening 25, where the inclination angle φ falls within a range of 0 [deg]<φ≦45 [deg] (see FIG. 9). Accordingly, the height h2 of the junction 22 almost constantly is increased from the protrusion 21 to the groove wall 24 of the circumferential main groove 2.

According to such configuration, because the inclination angle φ of the top of the junction 22 is appropriately determined, defective molding of the protrusion 21 and the junction 22 can be effectively reduced. Consequently, a flow of rubber at the protrusion 21 and the junction 22 is produced in a favorable condition, so that defective molding of the protrusion 21 and the junction 22 can be more effectively reduced. Accordingly, the protrusion 21 and the junctions 22 are formed in appropriate shapes, so that the pneumatic tire 1 has an advantage that functions of the protrusion 21 and the junctions 22 can be effectively performed.

[Application]

A problem of stone trapping in the circumferential main groove 2 and a problem of damage to a stone ejector (the protrusion) described above are particularly noticeable for a heavy duty pneumatic tire. Therefore, as the pneumatic tire 1 according to the embodiments is configured to be applied to the heavy duty pneumatic tire, an advantage is provided that the anti-stone-trapping performance of the tire and the anti-damage performance of the protrusion are remarkably improved.

[Performance Test]

In connection with the embodiments, several kinds of pneumatic tires were tested at different conditions through performance tests for checking (1) anti-stone-trapping performance, and (2) anti-damage performance of the protrusion (see FIGS. 10 to 13). The pneumatic tires that were tested in the performance tests had a tire size of 11R22.5, were mounted to a proper rim defined by JATMA, inflated with a regular inner pressure, and applied with a regular load. Those pneumatic tires were then fitted four each onto a drive shaft of a test vehicle of 2-D (two-wheel two-dual-wheel drive), and then the test vehicle was driven on an unpaved road for 5 [km]. After driving, the number of stone trapping in the circumferential main grooves and the number of damages portions on the protrusions were then checked. Averages of the number of stone trapping per tire and averages of the number of damaged portions are shown in FIGS. 10 to 13.

Pneumatic tires according to conventional examples 1 to 3 were not provided with junctions that couple a protrusion onto groove walls of each of circumferential main grooves. The pneumatic tires were in different conditions of continuity of the protrusion in the groove-length direction of the circumferential main groove, and the height h1 of the protrusion.

By contrast, pneumatic tires according to invention examples 1 to 12 were provided with the junctions 22 that couple the protrusion 21 onto the groove walls 24 of each of the circumferential main grooves 2 (see FIGS. 2 and 3). The pneumatic tires were in different conditions of continuity of the protrusion 21 in the groove-length direction of the circumferential main groove 2, the height h1 of the protrusion 21, arrangement of the junctions 22 to the protrusion 21, and the ratio W/P of the groove width W of the circumferential main groove 2 to the arrangement interval P between the junctions 22. Moreover, the inclination angle θ of the top of the protrusion 21 was set within a range of 3 [deg]≦θ≦30 [deg]. Furthermore, the inclination angle φ of the top of the junction 22 was set within a range of 0 [deg]<φ≦45 [deg].

As shown in the test results, according to the pneumatic tires 1 of the invention examples 1 to 12, it turns out that the number of stone trapping in the circumferential main grooves 2 and the number of damaged portions onto the protrusions 21 were decreased, and the anti-stone-trapping performance of the tire and the anti-damage performance of the protrusion were improved, compared with the pneumatic tires according to the conventional examples 1 to 3.

By comparison among the pneumatic tires 1 according to the invention examples 1 to 4, it turns out that as the ratio W/P of the groove width W of the circumferential main groove 2 to the arrangement interval P between the junctions 22 was appropriately determined, the anti-stone-trapping performance of the tire and the anti-damage performance of the protrusion became compatible.

By comparison among the pneumatic tires 1 according to the invention examples 5 to 7, it turns out that when the inclination angle α of the groove wall 24 of the circumferential main groove 2 with respect to the groove-depth direction varied periodically along the groove-length direction of the circumferential main groove 2, as the junctions 22 were arranged appropriately to the groove walls 24, the anti-stone-trapping performance of the tire was improved. Specifically, it turns out that as each of the junctions 22 was arranged relatively close to the position at which the inclination angle α of the circumferential main groove 2 took the maximum value αmax (the maximum portion and the middle portion), the number of stone trapping was reduced.

By comparison among the pneumatic tires 1 according to the invention examples 6, 8, and 9, as a variation of the angles α of the groove walls of the circumferential main groove 2 (the difference R between the maximum value αmax and the minimum value αmin) was appropriately determined, the pneumatic tire 1 had an advantage that the anti-stone-trapping performance of the tire and the anti-damage performance of the protrusion was improved.

By comparison among the pneumatic tires 1 according to the invention examples 10 to 12, when the groove wall 24 of the circumferential main groove 2 was inclined at the inclination angles α and β with respect to the groove-depth direction, as relation between the inclination angles α and β was appropriately determined, the pneumatic tire 1 had an advantage that stone trapping in the circumferential main groove 2 was reduced.

INDUSTRIAL APPLICABILITY

As described above, the pneumatic tire according to the present invention is useful because trapping of stones in the circumferential main groove can be reduced.

The invention claimed is:

1. A pneumatic tire that includes on a tread a plurality of circumferential main grooves extending in a tire-circumferential direction and a plurality of land portions formed by being partitioned by the circumferential main grooves, the pneumatic tire comprising:
   a protrusion that is formed on a groove bottom of at least one of the circumferential main grooves and extends along a groove-length direction of the circumferential main groove, and of which a height h1 is corrugated in a curvilinear wavelike form along the groove-length direction;
   a junction that couples the protrusion onto at least one of groove walls of the circumferential main groove,
   a plurality of the junctions are alternately arranged on both sides of the protrusion along the groove-length direction of the circumferential main groove, such that junctions on opposite sides of the protrusion are not aligned with each other in a width direction, and
   each of the junctions couples the protrusion onto only one of the groove walls of the circumferential main groove, and
   wherein a groove width W of the circumferential main groove and an arrangement interval P for the junction satisfy relation of $0.3 \leq W/P \leq 2.0$.

2. The pneumatic tire according claim 1, wherein the junction couples the protrusion onto the groove wall of the circumferential main groove at a position S at which the height h1 of the protrusion is at a maximum.

3. The pneumatic tire according to claim 1, wherein with reference to a cross section of the circumferential main groove in the groove-length direction and a groove-depth direction, an inclination angle θ between an inclination plane on a top of the protrusion and the groove bottom of the circumferential main groove falls within a range of $3 \text{ [deg]} \leq \theta \leq 30 \text{ [deg]}$.

4. The pneumatic tire according to claim 1, wherein when an inclination angle α of the groove wall of the circumferential main groove with respect to a groove-depth direction varies periodically along the groove-length direction of the circumferential main groove, the junction is arranged on a side closer to a position where the inclination angle α of the circumferential main groove becomes a maximum value αmax than a middle position between the position where the inclination angle α becomes the maximum value αmax and a position where the inclination angle α becomes a minimum value αmin.

5. The pneumatic tire according to claim 1, wherein when an inclination angle α of the groove wall of the circumferential main groove with respect to a groove-depth direction varies periodically along the groove-length direction of the circumferential main groove, a difference R between a maximum value αmax and a minimum value αmin of the inclination angle α of the circumferential main groove falls within a range of $5 \text{ [deg]} \leq R \leq 30 \text{ [deg]}$.

6. The pneumatic tire according to claim 1, wherein:
   the groove wall of the circumferential main groove is inclined at a plurality of inclination angles α and β with respect to a groove-depth direction, and
   the inclination angle α on a side adjacent to a groove opening of the circumferential main groove and the inclination angle β on a side adjacent to the groove bottom satisfy relation of $\alpha > \beta$.

7. The pneumatic tire according to claim 1, wherein a height h2 of the junction is increased from the protrusion to the groove wall of the circumferential main groove.

8. The pneumatic tire according to claim 7, wherein:
   a top of the junction is inclined at an inclination angle φ from the protrusion to the groove wall of the circumferential main groove toward a groove opening, and
   the inclination angle φ falls within a range of $0 \text{ [deg]} < \phi \leq 45 \text{ [deg]}$.

9. The pneumatic tire according to claim 1 that is configured to be applied to a heavy duty pneumatic tire.

* * * * *